G. W. LALLY.
DUMPING MOTOR VEHICLE.
APPLICATION FILED JULY 16, 1910.
1,018,118.
Patented Feb. 20, 1912.
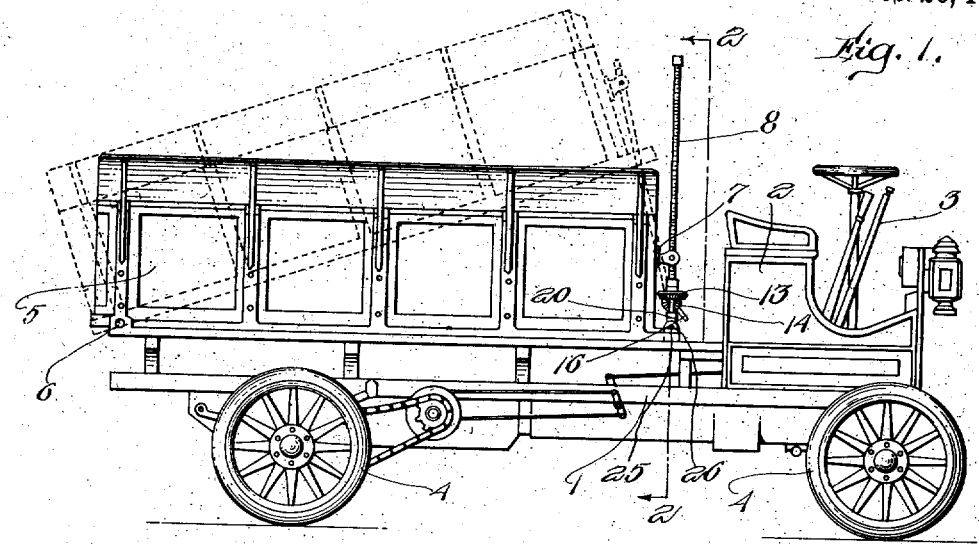
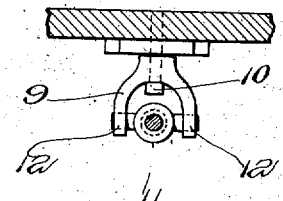
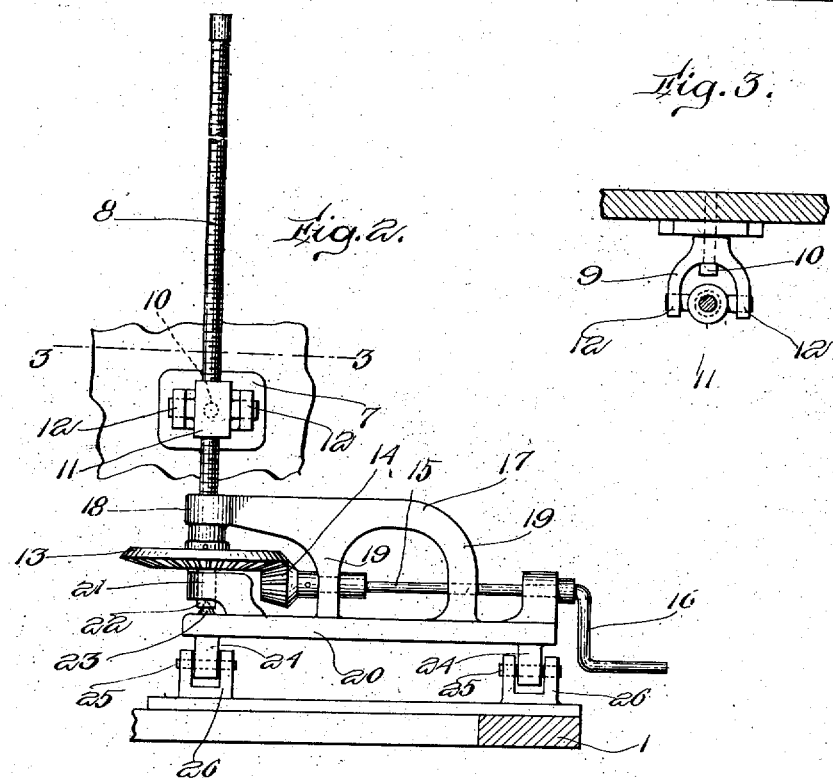
Witnesses:
Edward Maxwell
Thomas P Walsh
Inventor:
George W. Lally
by Geo. H. Maxwell,
Attorney

UNITED STATES PATENT OFFICE.

GEORGE W. LALLY, OF BOSTON, MASSACHUSETTS.

DUMPING MOTOR-VEHICLE.

1,018,118.   Specification of Letters Patent.   Patented Feb. 20, 1912.

Application filed July 16, 1910. Serial No. 572,319.

*To all whom it may concern:*

Be it known that I, GEORGE W. LALLY, a citizen of the United States, and resident of Boston, in the county of Suffolk and State of Massachusetts, have invented an Improvement in Dumping Motor-Vehicles, of which the following description, in connection with the accompanying drawings, is a specification, like characters on the drawings representing like parts.

My invention is a vertical screw-hoist auto truck, and relates to that class of vehicles known as dumping carts, commonly used in handling coal, bricks, and other products which are conveniently dumped or slid out of the box or container. The modern employment of the automobile or motor vehicle for transporting merchandise has enforced the desirability of using such vehicles for handling coal, but this necessitates various radical changes in the hoisting apparatus of such self-dumping automobiles or motor vehicles.

Accordingly my present invention aims to provide a motor vehicle of this character with a hoisting or dumping apparatus which, while exceedingly powerful, accommodates itself to the limited space and sidewise manipulation made necessary by the form of the vehicle.

The constructional details of my invention and the limitations of the latter will more fully appear from the following description, taken in connection with the accompanying drawings, in which I have shown a preferred embodiment of the invention.

In the drawings, Figure 1 shows in side elevation a vehicle provided with my invention; Fig. 2 is an enlarged fragmentary view in front elevation of the elevating mechanism, said view being taken approximately on the line 2—2, Fig. 1; and Fig. 3 is a cross-sectional view taken on the line 3—3, Fig. 2.

The vehicle frame 1, seat 2, controlling apparatus 3, truck gearing 4, etc., are of any usual or preferred kind. Mounted on the frame 1 behind the upstanding seat 2 is a usual heavy box or load carrier 5 pivoted at 6 for containing the coal and dumping the same when required. A bracket 7 is secured to the front of the box 5 and provided with a swivel connection for the lifting screw 8, said connection consisting of a U-shaped casting 9 pivotally mounted on a horizontal bolt 10 extending lengthwise of the box from the front thereof and a nut 11 having threaded engagement with the screw 8 and pivoted at its ends 12 in the arms of the casting 9. This gives the necessary freedom of movement between the screw and the box to accommodate the latter in all its movements. At its lower end the screw 8 is provided with a relatively large beveled gear 13 meshing with a pinion 14 on a shaft 15 which extends laterally at the left side of the vehicle, where it is provided with a handle 16 (usually removable). The screw 8 and shaft 15 are journaled in a relatively heavy casting 17, the screw being journaled in an overhanging arm 18 of said casting and the shaft 15 in depending arms or connections 19 which extend from a relatively heavy base 20. Said base has an arm 21 in which the lower end of the shaft 8 is loosely journaled, said lower end at 22 being provided with a conical recess fitting over a conical post 23 which preferably consists of a steel pin cast into the casting 20 to properly center and give a firm end bearing to the screw 8 to bear the weight of the latter and of the load, especially when the load is being raised from a horizontal to an inclined position, *i. e.* from the full-line position to the dotted-line position, Fig. 1. On its under side the base 20 is provided with lugs 24 pivoted on pins 25 in ears 26 on the frame of the machine.

The object of my invention is to provide a simple inexpensive construction which at the same time shall be very strong and not liable to wear out or grind out quickly from the character of the work. The work which this apparatus is called upon to endure is of a rough hard nature, and because of the coal dust and grit, the bearings of such apparatuses are apt to wear out. But my construction largely obviates all this. By having an open space between the bearing 21 and the base 20 around the end of the screw shaft 8, if any grit gets into this bearing, it simply works right through and drops out at said opening. The conical end bearing further facilitates the self-cleaning. By having the beveled gear 13 turned with its teeth on the under side and having the same large so that the pinion 14 is practically housed or sheltered beneath said gearing, all the teeth of the two gears are protected from the falling coal which would otherwise get into them when the vehicle is being loaded. By providing a long bearing for the shaft 15 and mounting the latter as close as possible to base 20 of the casting, and by providing widely separated supports 26 for the opposite ends of said casting, great strength is secured without undue weight. Also by having the gear end of the casting provided with a bearing adjacent its upper edge and another at its extreme lower edge, it resists the strain to the best advantage which is brought upon it when the load is being raised to the dotted-line position. The weight of the load is moreover transmitted to the various bearings one above the other in one and the same vertical line.

I do not intend to limit the invention to the precise structural details herein shown in the preferred structure, as many changes may obviously be made within the limits of the hereinafter expressed claims without departing from the spirit and scope of my invention.

Having described my invention, what I claim as new and desire to secure by Letters Patent, is:

1. A dumping motor vehicle, comprising a pivotally mounted load carrier, an elevating screw having threaded engagement with one end thereof, gearing for operating said screw, and a pivoted bracket support for said gearing and the lower end of said screw, said support having an upward projection to fit into a socket in the lower end of the screw to provide a grit-shedding bearing.

2. A dumping motor vehicle, comprising a pivotally mounted load carrier, an elevating screw having threaded engagement with one end thereof, a base mounted on transverse pivots on the vehicle and carrying a pivot support for said screw, driving means for said screw extending transversely in a common plane with said pivots to a point adjacent the side of the vehicle, and a bracket fixed to said base having bearings rigid with relation to each other for said driving means and also for said screw whereby said parts are held in fixed relative position.

3. A hoisting apparatus for a vehicle of the kind described, comprising a hoisting screw, a nut for communicating the motion thereof to the part to be hoisted, a supporting bracket for the lower end of the screw adapted to extend transversely of the vehicle and provided on its under side with spaced apart pivotal bearings, a gear wheel carried by said screw, said bracket having two overhanging journal bearings for said screw, one above said wheel and one below the same, and a pinion and pinion shaft journaled longitudinally of said bracket to extend laterally of the vehicle for operating said gear wheel and screw, said bracket being provided with a conical end bearing pin for the extreme lower end of said screw, the overhanging lower journal bearing of said bracket affording an open space about said pin and said extreme lower end of the screw to aid the bearings in freeing themselves of grit.

In testimony whereof, I have signed my name to this specification, in the presence of two subscribing witnesses.

GEORGE W. LALLY.

Witnesses:
M. J. SPALDING,
EDWARD MAXWELL.